United States Patent Office

3,396,033
Patented Aug. 6, 1968

3,396,033
WHEAT GERM AND SOYBEAN PROCESS FOR EXTRACTING GLUTATHIONE THEREFROM
Peter J. Ferrara, 50 E. 78th St., New York, N.Y. 10021, and Gaston Dalby, 51 5th Ave., New York, N.Y. 10011
No Drawing. Filed July 29, 1964, Ser. No. 386,073
12 Claims. (Cl. 99—80)

ABSTRACT OF THE DISCLOSURE

Reduction of glutathione in wheat germ and soybean products to the sulfhydryl compounds with a reducing agent and removing said compounds by means of an azeotropic solvent mixture.

---

Our invention relates to the production and processing of wheat germ, soybean flour, and similar cereal products for use in combination with ordinary flours without loss in the baking strength of such flours, or causing any of the adverse dough characteristics underlying baking quality.

Many important sources of human foods are based on processed flours and cereal products. These products, including wheat, rye, corn, soybean, oats, and rice, among others, provide useful means for obtaining nutritive proteins, vitamins and energy requirements. The selection of the cereal to be used, and in what manner and percentage, is often based on factors such as availability, cost, flavor and taste, as well as custom. Thus, these factors, coupled with the varied nature of the protein cereals give rise to a wide diversity of processing techniques. Even with many new and novel technological advancements, however, there still exist numerous situations wherein the recognized advantages and benefits of specific cereal products cannot be translated into acceptable and palatable foods of commerce without bringing about a number of complications.

The present invention has as one of its objects, a method of processing cereal fractions having high vitamin and flavor value so these may then be incorporated into a wide variety of food products, retaining a high order of suitability in terms of the final product. Moreover, the invention results in products which would encourage a large increase in the use of these readily available, low cost, sources of nutritive foods.

More particularly, for illustrative purposes, we chose to use wheat germ as a first example, showing a clear-cut case where, despite the rich concentrations of vitamin B and B complex appearing in the ordinary embryo of cereal grains, while universally acknowledged, pose serious processing problems, at the point of consumption.

In milling wheat into flour, the miller exercises particular care to segregate the wheat germ portion from the main flour. The principal reason is that a flour containing substantial levels of wheat germ tends to become stale or rancid in a much shorter interval of storage than a flour with lesser amounts of germ. Moreover, the greater incidence of germ in the flour results in a flour having inferior baking properties with respect to crumb texture, volume of loaf, symmetry, and other criteria of flour baking efficiency. These adverse baking results caused by wheat germ in a flour dough are known to those versed in the art of baking. The consequence is that a product such as wheat germ possessing interesting values of flavor, vitamins and protein, can be used by the baking industry only in very small amounts, if at all.

Our invention produces a wheat germ product which has none of these disadvantages.

The problem of wheat germ in baking is that it contains high levels of glutathione, a tripeptide of three amino acids: glutamic acid, cysteine and glycine. These amino acids are linked together through $CONH_2$, the usual peptide bond. The —SH (sulfhydryl) of cysteine is easily oxidized in the presence of an oxidizing agent, or the usual flour improving agents. When this occurs, two molecules of glutathione are linked together in the form of a disulphide.

In our work we have confirmed the generally held views that glutathione is present in wheat germ in three states: the reduced form commonly referred to as GSH; the oxidized or disulphide state generally known as G-S-S-G; and, an oxidized form wherein the disulphide bridge links glutathione with a cysteine molecule of the flour protein.

Numerous experimenters have applied a variety of techniques to avoid the baking difficulties caused by the presence of glutathione in wheat germ. We have found that previous methods to resolve the problem of glutathione in wheat germ have failed to satisfy the requirements of the baking industry. The major reason for this deficiency is due to the fact that these approaches are directed only at the glutathione in the reduced form.

In our co-pending patent application Ser. No. 288,451, filed June 17, 1963, "Inactive Dry Yeast and Process of Making Same," now Patent 3,395,990, issued January 3, 1967, we show that yeast, also a source of glutathione, behaves similarly to wheat germ, having unfavorable action on dough characteristics. Furthermore we have discovered that this action results from the oxidized form of glutathione as well as the reduced state. Thus removing or sequestering only the reduced glutathione does not eliminate the problems the baker suffers with glutathione in wheat germ or yeast.

Accordingly, our invention eliminates glutathione, in whatever form it may be present, from subsequently interfering with the chemistry involved in dough behavior. Thus, we subject the wheat germ to the action of a reducing agent thereby converting the G-S-S-G into the natural or reduced GSH form, which is readily soluble in water, ammonia, and dimethyl-formamide. We prefer the use of reducing agents which when incorporated into a solvent mixture, are capable of causing the reduction of the G-S-S-G to GSH, and the selected solvent simultaneously extracts the wheat germ oil and dissolves the glutathione all of which is now in the reduced state. While a large number of reducing agents capable of effecting the glutathione reduction in the presence of a solvent system are well known in the art, we prefer the use of ascorbic acid, iso-ascorbic acid and salts of these acids. Solutions of zinc in sulphosalicylic acid; volatile aldedyes of low molecular weight such pyruvic aldehyde, nascent hydrogen; HCN gas; reductic acid, and other forms of reducing agents all can produce results which are within the scope of this invention.

In the solvent extraction of the wheat germ as well as other oil bearings seeds or embryos, a wide variety of solvents capable of dissolving the contained oil content of the seeds and the reduced glutathione are known and may be utilized by those familiar with the art of solvent extraction. We have found that removal of glutathione by solvents is ideally served by combining some of the usual paraffinic solvent materials with primary and secondary alcohols of low molecular weight. The alcohols impart to the paraffnic solvents the properties of high polar action. A polar type of solvent system is greatly preferred for the solution of glutathione as GSH. We have found that primary low molecular weight alcohols including low cost materials such as methanol, ethanol, isopropanol and butanol work exceptionally well with petroleum ether, hexane, and other volatile paraffins. These solvent systems may include aldehydes and ethers, ketones and aromatic compounds. Mainly the solvent selection hinges on whatever compounds impart the degree of extractability and volatility to satisfy the requirements of a feasible process for recycling the recovered solvent after separating it from the recovered oil fraction, the elimination of glutathione from wheat germ, and the production of a final wheat germ product retaining unimpaired values of vitamins, desirable flavor and palatability characteristics. The final wheat germ product must also satisfy the requirements of the pure food aspects of commerce. In the preferred embodiments of our invention, we select volatile mixtures which in distillation practice are referred to binary, ternary, and quaternary component systems. Moreover, our preference is for solvent mixtures which will form readily distillable azeotropes, which when recovered from the miscella can easily be adjusted to the correct proportions for reuse in the solvent extraction step. These aforementioned references will reveal to those well versed in the art of applying solvent extraction techniques that the objectives of the invention may be accomplished by solvent extraction in a single step, or in series fashion; batchwise or continuous, all depending on the size of the installation, and the specifications of the final wheat germ product, and the co-product wheat germ oil. Any solvent extracted wheat germ produced according to this invention may be recovered and dried as desired, or as dictated by subsequent use of the product, all factors readily managed by processors.

We have as discussed hereinbefore, indicated a technique to accomplish the reduction of oxidized glutathione, and its removal by various polar solvent systems, the following being one specific example. We have prepared a mixture of commercial hexane solvent (also called petroleum ether) and isopropyl alcohol. Mixed in the ratio of approximately 78 parts of hexane and 22 parts of alcohol, this mixture not only is a most effective solvent for extracting wheat germ oil, but at standard atmospheric conditions, forms an azeotrope boiling in the range of 135° F.–138° F. A mixture of ethyl alcohol and petroleum ether also shows solvent and distilling properties very much the same. Nitro-paraffins and chlorinated paraffin derivatives may also be used to create the solvent system offering polar properties to dissolve the GSH form of glutathione.

Specifically we take raw, full-fat wheat germ and add to it enough mixed solvent to immerse the germ in a conventional flask. To the solvent mixture, we then introduce a reducing agent such as the isoascorbic or ascorbic acids, or the salts of these acids. With a reflux condenser attached to the flask, the contents are brought to a gentle boil. In only a few minutes, the wheat germ oil is dissolved from the germ, and the solvent extract is separated from the germ. The amount of reducing agent needed to effect the reduction of the oxidized glutathione is a function of the amount of oxidized (or G-S-S-G) glutathione present in the wheat germ. We have found that most grades of commercial wheat germ may be treated successfully in our process with ascorbic acids or their salt derivatives, individually or in combination which may be as little as 0.02% based on the weight of the germ, while with some grades of germ, to obtain equivalent baking performance of the final extracted germ, 1.0% based on the weight of the germ may be required. The preferred average range for the desired elimination by reduction of the G-S-S-G is between 0.15% and 0.60% of the mentioned reducing agents based on the weight of the wheat germ.

With these concepts we cite as an example: 800 grams of a raw wheat germ product milled from an ordinary hard red winter wheat are placed in a 4 liter flask. The germ has a moisture content of 10.6% moisture, and an oil content of 7.9%. The protein content of the germ is 31.3%. To the germ, we add 2000 ml. of a mixture of isopropyl alcohol and hexane (petroleum ether), 22 parts of isopropyl alcohol to 78 parts of hexane. Then we add 0.68 gram of isoascorbic acid and 1.42 grams of ascorbic acid. The solvent mixture containing the reducing materials is refluxed for 20 minutes. The temperature of the boiling solvent is 135° F. The flask and its contents are cooled and the solvent extract drained through a fine filter cloth. The germ may be rinsed once with a small quantity of fresh solvent, and then partially dried at a reduced pressure to avoid overheating. Finally, drying of the germ may be achieved by any one of the preferred techniques. In the test referred to here, the extracted germ was heated to 175° F. from an infra-red heat source. The final oil content of the germ was 0.57%.

To demonstrate the beneficial action of the reducing agents in the making of a wheat germ having no glutathione but greatly improved properties for baking purposes, a control wheat germ product was similarly extracted, except that the reducing agents were omitted. The dried treated wheat germ product, and the dried control were processed into wheat breads wherein wheat flour containing 5% (bakers' percentage) wheat germ was included. Both germ products were ground to a fine flour before being tested in flour doughs. The breads were produced by many laboratories associated with the baking industry from a conventional sponge-dough formula in the standard manner employed for evaluating the bake characteristics of various ingredients. Examination of the resulting breads, and applying the preferred scoring system of the cereal technologists, the wheat germ treated for glutathione removal gave results which very closely approximated the scores of the bread doughs made without the supplemental addition of germ; while the extracted germ not having the benefit of the reducing agents in the solvent extraction step, produced breads that had a coarse open-grain texture and poor crumb, and reduced loaf volume. Moreover, the latter doughs were weak and gassy and were handled with some difficulty.

In another example with a wheat germ product derived from a soft white wheat, we found that the proper degree of glutathione removal, equal to the results reported for the hard winter wheat, necessitated, based on the 800 grams quantity of wheat germ, 1.85 grams of sodium ascorbate, 2.20 grams of iso-ascorbic acid, and 2.67 grams of ascorbic acid. With these increased requirements of reducing materials to act on the G-S-S-G of the oxidized glutathione, we found that the chemistry actions involved required less than 10 minutes, and the final dried wheat germ product had a lighter color. The lighter color of the final germ product made itself apparent, too, in the bread baked with it.

The processing of wheat germ in a manner consistent with the process of this invention, was further evaluated in terms of the vitamin B and B complex remaining in the final germ, and in the availability of vitamin E potency in the solvent free wheat germ oil. On both counts, the method of processing showed the removal of the glutathione in no way caused the diminution or loss of vitamin values.

While the baking properties of the solvent extracted wheat germ are used as a means of demonstrating the presence or absence of glutathione either as reduced (GSH) or oxidized form (G-S-S-G), there are a number of published qualitative and quantitative analytical techniques which may be applied to follow the removal of the glutathione which is charged with causing the disruptive actions in flour doughs. These testing methods developed over a period of some 40 years of biochemical research may be found in the glutathione literature by anyone interested in assigning more precise units of glutathione measurement, than those demonstrated by baking results.

The novel solvent extraction system containing a reducing material, as previously discussed, was also modified to enable the production of a solvent extracted soybean flour having baking characteristics, of a preferred order. As previously indicated, there are other important cereal products possessing unique values of nutrition, but which have failed to generate high level consumption as components in human foods because of certain objectionable properties, heretofore inherent in their very nature. Moreover, no practical solutions have in reality come about, despite the application of new technology, to offset the adverse effects of such important cereal products in common food preparations. A member of this cereal product category is soybean flour or soybean powder.

The exceptional merits of soybean flour as a nutritional ingredient supplement in bread as well as in macaroni, or pasta are well known. In each of these areas, the dimension of soybean nutrition is already acknowledged in that the present food standards in the United States for bakery goods and alimentary pastes provide for the use of tolerable amounts of soybean flour. Soybean protein possesses uniquely high values of lysine which is an amino acid not very generously present in wheat flour and the durum flours for pasta. In addition soybean flours have exceptionally high protein levels compared with even the most selected grades of wheat flours. Even beyond this, is the fact that the planting and cultivation of soybeans has been a world-wide endeavor for many years. At present in the regions generally rated deficient in supplies of nutritional quality proteins, soybeans are commanding increased attention. Despite the recognition of its exceptional quality protein and its generous availability, and at low cost, soybeans have been channeled more into areas of animal feeds than direct human foods. The reasons may be many, but one of the main deterrents has been in baked goods as well as pasta, the presence of high levels of glutathione which has made the use of soybean flours even more of a problem than was cited against wheat germ.

One of the objectives of our invention, therefore, has been the processing of soybean flours so these may be more readily converted into useful ingredients for a wide assortmnt of palatable, and useful foods, including breads, crackers, and pasta. To fulfill this broad objective, we have established two novel processing means which will be hereinafter discussed in some detail. To those well versed in the art of making soybean flours and products of soybeans, it will be apparent that the novel process techniques of our invention may be extended to include a number of variations, all of which will be within the framework of our invention.

One of the applications of our invention is to use, as in the instance of wheat germ, a solvent extraction system which is polar through the judicious selection of the solvent system components. In the case of soybeans, which when processed are put through a sequence of operational steps including tempering, cracking, hulling and flaking, we prefer to start with the flattened flakes which are high in oil content, between 18–22%, and even higher in protein usually in excess of 4% protein. The polar solvent system for the oil removal will also include reducing agents capable of converting glutathione having G-S-S-G into the water soluble glutathione having the GSH group.

We have found that soybean flakes when subjected to the reducing action of the same ascorbic compounds or isomer compounds of ascorbic respond in the same fashion as wheat germ, even more readily. The exact reason for this more facile response is not understood, though the evidence points to the presence, in soybean flakes, of a very powerful enzyme system which adds to the effectiveness of the reducing materials. Thus when employing the ascorbic compounds at the levels reported for wheat germ, we not only produce a solvent extracted soybean flour which is uniquely suited for use as a baking ingredient, but the presence of oxidized forms of carotene or carotenoids in soybeans are easily observable to the naked eye. This form of carotene which is yellowish-pink is not objectionable in baking or pasta, in that it adds a desirable color, mostly yellow-gold, with very little brown pigment, to these final products. Moreover, the beany flavor of the soybean flour is reduced considerably, if not entirely eliminated. The reason for the disappearance of the beany flavor is not known. In no instance, however, have we discovered that the soybean oil extracted by the process of our invention offers any complications in the subsequent oil refining steps practiced commercially, and in the conventional manner.

We have found that a binary solvent mixture of hexane and ethyl alcohol, mixed in the ratio of 79 parts to 21 parts by weight, gives rise to an azeotrope which boils in the range of 133–136° F. This low temperature adequately protects the soybean enzyme system, which seems to improve the action of the reducing materials on the G-S-S-G. There are, as pointed out in the case of wheat germ, a number of important combinations of the usual solvents which may similarly be useful, but the systems with ethyl alcohol and isopropyl alcohol in combination with hexane perform exceedingly well.

In one example of processing soybean flakes for the production of a fat-free flour, we take 1200 grams of flakes assaying 18.9% oil, 10.8% moisture, and 40.4% protein. The flakes are placed in a 4-liter flask, and covered with 2000 ml. of the alcohol-hexane solvent mixture. Then we add 1.52 grams of sodium ascorbate, 0.80 gram of isoascorbic acid and 1.16 grams of ascorbic acid. The flask is attached to a reflux condenser, and boils gently at a temperature of 133° F. After 15 minutes, the contents of the flask are cooled and drained. The soybean flakes are rinsed several times, with a warm solution of the solvent mixture, then dried first at a low temperature, then at a temperature of 185° F. The dried soybean flakes show virtually no sulfhydryl content by the nitroprusside test for GSH. When reduced to a flour the treated flakes, compared to soybean flour processed without the reducing agents possess greatly improved baking properties. In addition, mixtures of 88% durum wheat flour, and 12% solvent extracted soybean flour produced by our invention were tested according to the procedure of the American Association of Cereal Chemists to determine the effect the soybean flour had on macaroni or noodle doughs.

A good grade of durum wheat flour without the addition of soybean flours, will show a yellow color reflectance of 50%–55%. The inclusion of 12% of the treated soybean flour gave a yellow reflectance of 50%, while a mixture containing the ordinary grades of soybean flour produced a yellow reflectance of 39%. This lower value of yellow reflectance is in good agreement with the average of the currently available grades of soybean flours used in macaroni and noodle products.

In another example of treating soybean flakes with a reducing agent, we acidulated the mixture of the hexane-alcohol solvent and the flakes, and added a small quantity of sodium cyanide as a means of releasing "in situ," a small amount of HCN gas which, of course, is a powerful reducing agent. 1200 grams of soybean flakes were placed in a flask, along with 2000 ml. of a mixture of 78 parts of hexane and 22 parts of isopropyl alcohol. Enough 2.N-HCL was added to lower the pH to 2.8. To the acidulated mixture we then added 0.94 gram sodium cyanide, and refluxed the mixture for 20 minutes at a temperature of 139° F. The sodium cyanide is converted into sodium chloride, the cysteine or G-S-S-G, whichever or both, are reduced one-half to the water soluble forms containing SH, and the remaining half to the amino-thiazoline carboxylic acid form. The soybean flakes were drained free of solvent, and given two additional rinses with 800 ml. of solvent. The extracted flakes containing 0.38% oil were dried as before, and tested for color and bake characteristics. Once again, the removal of glutathione, or the cysteine component can be shown by the scoring of breads produced with the treated extracted soybean flours, to have caused a substantial improvement in bake results.

The processing of soybean flakes may be accomplished with the use of reducing materials in the solvent system, and in the case of using ascorbic acid, iso-ascorbic acid, and salts of these acids, the requirements of the compounds in the aggregate need be no greater than 0.50% in most cases, and can be as low as 0.06%. The preferred average seems to be in a range of 0.20% to 0.40%. When the reducing agents used are active compounds such as HCN, the amount of such agents bears an approximate stoichiometric relationship to the sulfur component, either cysteine or G-S-S-G, capable of being reduced.

By our process the conversion of oxidized glutathione, to the reduced form GSH in wheat germ, soybean flour and similar foods is achieved; and by bringing about the interaction of the SH with a class of compounds capable of reacting with the SH so as to form thio-compounds which have been shown to have no adverse effect on flour doughs, it is obvious that like results are obtainable with wheat germ and soybean flours whether solvent extracted or not.

What we claim is:

1. A process of producing edible wheat germ and soybean products which comprises reducing the oxidized glutathione in said products to a reduced form and extracting said glutathione with a solvent in which said glutathione in reduced form is soluble, whereby said products are free from significant amounts of glutathione, including the oxidized and the sulfhydryl forms of glutathione.

2. The process of claim 1 in which said product is wheat germ and in which said solvent is a solvent also for the wheat germ oil contained in said wheat germ.

3. The process of claim 1 in which the product is a soybean product.

4. The process of claim 1 in which the glutathione is reduced by a member of the class consisting of ascorbic acid, isoascorbic acid and the salts of ascorbic acid and isoascorbic acids dissolved in said solvent.

5. The process of claim 1 in which said solvent is an azeotropic mixture of an alcohol of low molecular weight and an aliphatic hydrocarbon of low molecular weight.

6. The process of claim 5 in which said alcohol is a primary alcohol having less than five carbon atoms.

7. The process of claim 5 in which said aliphatic hydrocarbon is hexane.

8. The process of claim 5 in which the solvent is a mixture of 78 parts by weight of hexane and 22 parts of isopropyl alcohol.

9. The process of claim 5 in which the aliphatic hydrocarbon is a chlorine substituted hydrocarbon.

10. A process of producing edible wheat germ and soybean products which comprises adding to said product a mixture of ascorbic acid, isoascorbic acid, and a solvent for said acids, comprising isopropyl alcohol and hexane, refluxing said mixture of the product, the acid and solvent at about 135° F., then draining the solvent and acids with the glutathione extracted therein from the product and drying the product.

11. The process of claim 10 in which sodium ascorbate was also present in the solvent.

12. The process of claim 10 in which the product is a member of the class consisting of wheat germ and soybean flours.

References Cited

UNITED STATES PATENTS

| | | | |
|---|---|---|---|
| 2,314,282 | 3/1943 | Levin | 99—80 |
| 2,879,167 | 3/1959 | Grandel | 99—80 |
| 2,930,700 | 3/1960 | Bradof | 99—99 |
| 3,168,406 | 2/1965 | Mosby | 99—99 |

OTHER REFERENCES

Freilich et al.: "Cereal Chemistry," vol. XXI, July 1944, No. 4, pp. 241–246.

Federal Register, Aug. 8, 1950, p. 5105, items 30 to 33.

Markley: "Soybeans and Soybean Products," vol. II, 1951, SB 205. S7 M34, pp. 960–963.

Pyler: "Baking Science and Technology," vol. I, 1952, TX 763 P98, pp. 186–188.

RAYMOND N. JONES, *Primary Examiner*.